Sept. 8, 1931.  E. L. BEECHER  1,821,958
LIQUID LEVEL INDICATING MEANS FOR MULTIPLE CELL STORAGE BATTERIES
Filed March 18, 1929  2 Sheets-Sheet 1
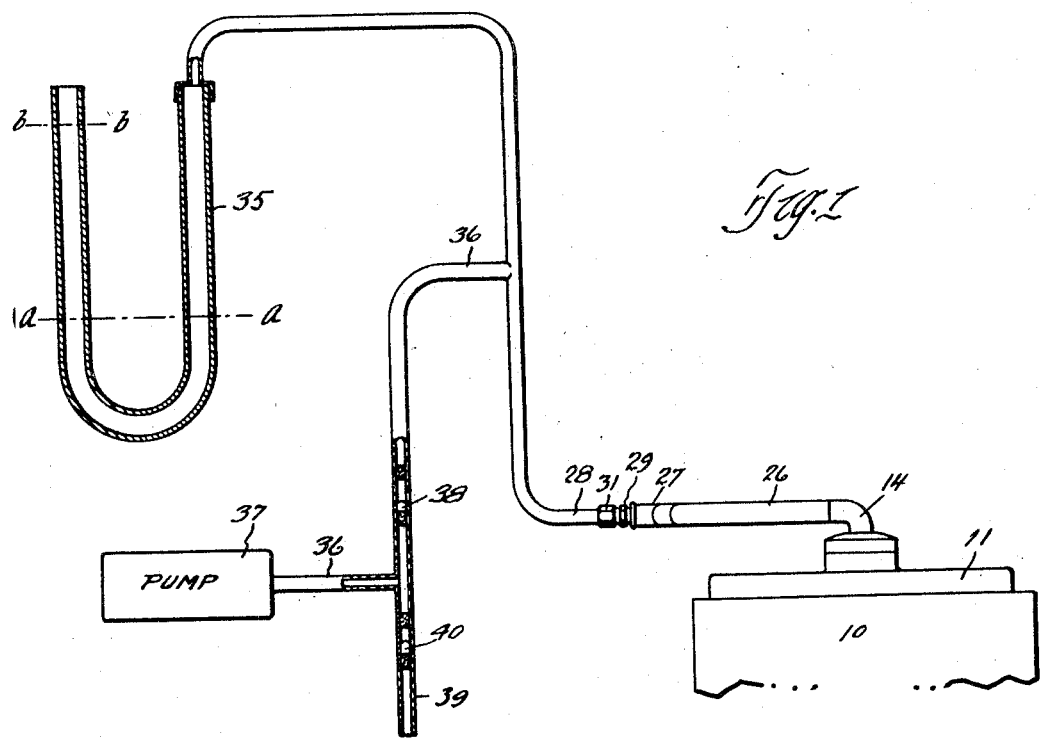
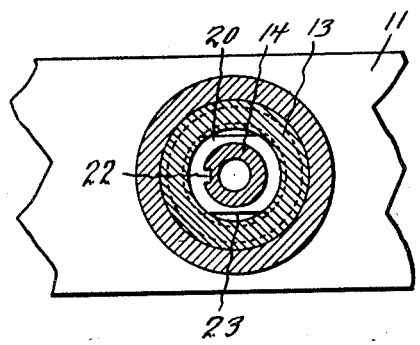
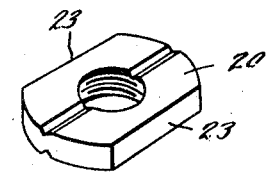
INVENTOR
Eugene L. Beecher
BY Hull, Brock & West
ATTORNEY Sept. 8, 1931.   E. L. BEECHER   1,821,958
LIQUID LEVEL INDICATING MEANS FOR MULTIPLE CELL STORAGE BATTERIES
Filed March 18, 1929   2 Sheets-Sheet 2
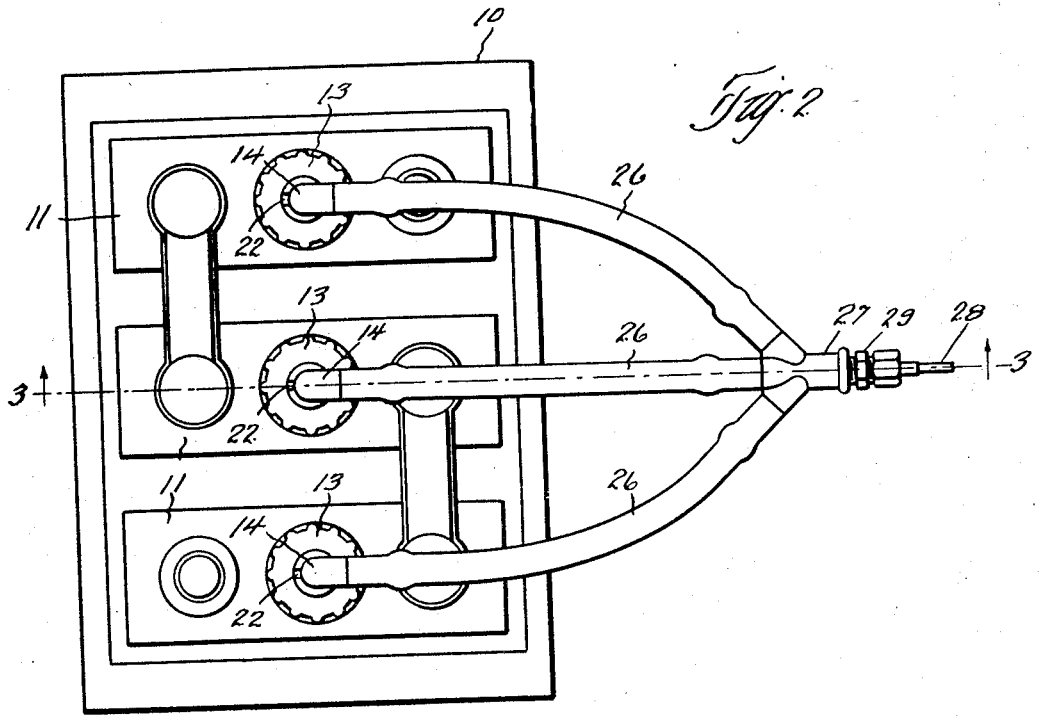
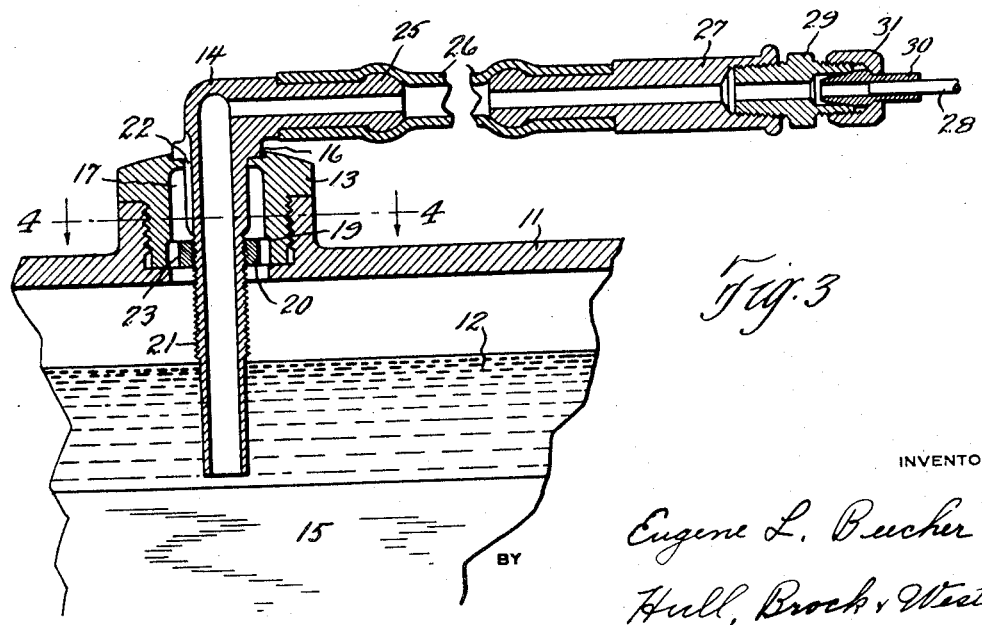
INVENTOR
Eugene L. Beecher
Hull, Brock & West
ATTORNEY Patented Sept. 8, 1931

1,821,958

UNITED STATES PATENT OFFICE

EUGENE L. BEECHER, OF CLEVELAND, OHIO, ASSIGNOR TO THE GABRIEL COMPANY, OF CLEVELAND, OHIO, A CORPORATION OF OHIO

LIQUID LEVEL INDICATING MEANS FOR MULTIPLE CELL STORAGE BATTERIES

Application filed March 18, 1929. Serial No. 347,775.

This invention relates to liquid level indicating means for multiple cell storage batteries and particularly to means wherein the hydrostatic pressures from the liquids in the cells of the battery control the indicator which may be conveniently located on the instrument board of the automobile with which the battery is used.

One of the objects of the invention is to provide means for conducting hydrostatic pressures from the liquid of a storage battery of an automotive vehicle to a suitable gauge on the instrument board.

A further object is to provide electrolyte resisting conduit fittings which may be used with the batteries already in use and in which the fittings are secured in the plugs for the filler openings and remain intact when the filler plugs are removed when the battery is being serviced, and in which no other connections or disconnections need be made when the battery is changed.

A further object is to provide a vent in combination with the fittings for the escape of gas generated in the battery or the air pumped into the battery to clear the same of liquid, and suitable baffles to prevent the liquid from escaping therethrough.

A further object is to provide a conduit fitting in combination with the vent or filler cap of a storage battery which permits rotation of the cap without disconnecting the conduit therefrom.

Another object is to utilize the original filling plug to receive the elbow fitting and associated parts by enlarging the original vent orifice.

Another object is to provide flexible means for conducting hydrostatic pressures from two or more cells of an electric storage battery into a single conduit, the flexible means comprising dielectric flexible tubing interposed between the cell fitting and a manifold of non flexible dielectric material, and the manifold having a metal end for receiving the single conduit leading to an indicating manometer.

A still further object is to provide multiple fittings of dielectric electrolyte resisting material for storage batteries the ends of which are normally immersed in the electrolyte to the top of the plates, the fittings being connected to a manifold which in turn is connected by a single conduit to a manometer, the manometer indicating the lowest level of liquid in any one cell above the plates of a multiple cell storage battery.

In the drawings Fig. 1 is a diagrammatic view of the complete liquid level indicator associated with a storage battery; Fig. 2 is a top plan view of the fittings associated with the vent or filler caps of the storage battery and connected by flexible dielectric tubing to a manifold to which is connected the conduit leading to a manometer; Fig. 3 is a vertical section on the line 3—3 of Fig. 2; Fig. 4 is a sectional view on the line 4—4 of Fig. 3, and Fig. 5 is a perspective view of the nut for holding the fitting in the filler opening plug of the battery.

Describing by reference characters the various parts of my invention illustrated in the accompanying drawings, 10 designates a storage battery of the wet cell type having three cells 11 connected together in the usual manner and 12 the electrolyte within the cell the depth of which is to be continuously registered at a point remote from the battery itself.

Each cell 11 is provided with the usual filler opening into which a plug 13 is threaded, the plug customarily having a small vent opening through which gases generated within the battery may escape. The plug 13 illustrated in the drawings has the vent opening enlarged to receive one end of an L-conduit fitting 14 which projects into the electrolyte and terminates just above the battery plates 15. A flange 16 on the fitting 14 engages the top of the plug 13 and determines the distance the fitting is to be inserted therethrough. A counterbore 17 in the plug provides a space about the fitting and a second counterbore provides a shoulder 19 against which a nut 20 engages when screwed onto the threaded portion 21 of the fitting to hold the same in the plug while permitting relative rotation between them. To provide a vent through which the gases generated in the battery may escape the fitting member 14 is provided with a groove 22 which leads out through the plug from the space 17. The nut 20, as illustrated in Fig. 5 has two flat sides 23 which provide openings between the space 17 and the cell 11 so that gases from the cell may readily escape, while at the same time the nut 20 acts as a baffle and prevents the electrolyte from splashing out of the vent or being carried therethrough by the gases.

The outer end of each fitting 14 is provided with an enlarged portion 25 over which one end of a short piece of a dielectric flexible tubing 26 is slipped so that it is securely held thereon. The opposite ends of the conduits 26 are connected to the three branches of a manifold connector 27 from which leads a brass conduit 28 connected thereto by a threaded metallic coupling 29 in which the enlarged end 30 of the conduit 28 is held by a clamping cap nut 31.

The fitting 14 and nut 20 as well as the three way manifold 27 are made of non-flexible dielectric, battery electrolyte resisting material, preferably hard rubber, the same as the casing of the battery itself.

The conduit 28 is connected at its opposite end to one leg of a manometer tube 35 in which a suitable liquid is free to move under fluid pressure in the tube 28. A branch conduit 36 leads from the conduit 28 at any suitable point to an air pump 37. To permit air to flow only from the pump to the conduit 28, the conduit 36 is provided with a mercury check valve 38. 39 denotes an inlet extension of the conduit 36 which communicates with the portion of the said conduit leading to the pump for the purpose of supplying air to the latter to be forced therefrom to the check valve 38. In order to prevent the air which is delivered on the compression stroke of the pump from passing outwardly through the connection 39, the said connection is provided with a mercury check valve 40 which permits the air to pass thereby on the suction stroke of the pump but which prevents the air from passing thereby on the compression stroke of the pump.

The pump 37 may be of any desired construction although for this use the type of pump illustrated and described in my copending application No. 321,285, filed Nov. 23, 1928 will give good results. The pump disclosed in that application is merely a closed chamber having the one conduit 36 leading therefrom. With this chamber located in close proximity to the exhaust manifold of the car engine, the variations in the speed of the engine causes an expansion and contraction of the air in the chamber, due to fluctuations in temperature of the exhaust manifold. As the air in the chamber contracts, more air is drawn in through the conduit 39, and on expanding it is forced out through the conduit 36 into the conduit 28. The pump 37, however, may be a mechanically operated pump of any known design.

The indicator herein disclosed is operated entirely by the hydrostatic pressure of the battery liquid, this pressure being transmitted to the gauge 35 by a conduit 28 into which a fluid is pumped to keep the battery liquid from entering the connector 14. The gauge 35 which in the form illustrated is a manometer is graduated so that the changes of the level of the liquid therein may be noted.

With the battery liquid 12 at its normal level in the cell 11 and the liquid in the manometer at its normal level $a—a$, air is forced into the conduit 28 by the pump 37 until all the liquid is forced out of the fitting 14, and a certain definite air pressure in excess of atmospheric pressure is thus maintained in the line 28. When the air pressure in the tube 28 exceeds the hydrostatic pressure of the liquid 12 the excess air passes out through the electrolyte and escapes through the vent 22. With this increased air pressure in the conduit 28 the liquid in the manometer is forced up to a point as at $b—b$, and as long as the liquid is at that point it is evident that the level of the liquid in the battery is normal. With less electrolyte in the battery the hydrostatic pressure is of course less and the pressure of the air in the conduit 28 is necessarily lower, permitting the liquid in the manometer to fall from its normal high level.

It is obvious that since each cell of the battery is connected to the one conduit 28, the level of the cell containing the least electrolyte is the one which is indicated in the manometer since any pressure in excess of the hydrostatic pressure in that cell will escape through that cell.

While I have illustrated a manometer being used to register the pressure in the conduit 28 it is apparent that any pressure gauge sensitive to small variations in pressure may be used and while I have illustrated only one embodiment of my invention, it is understood that various changes may be made without departing from the spirit of the invention or the scope of the appended claim.

Having thus described my invention, what I claim is:—

In combination with a closure for the filler opening of a storage battery having an opening therethrough, a dielectric, battery electrolyte resisting conduit fitting projecting a predetermined distance through said closure and rotatably received therein, said closure having a counterbore about the inner portion of the fitting, said fitting having a groove providing an opening from said counterbore to the outer end of the closure, a nut threaded on the inner end of said fitting for securing the same in said closure, said nut and closure together being provided with an opening leading from the lower side of the closure to said counterbore whereby gases may escape through said closure.

In testimony whereof I hereunto affix my signature.

EUGENE L. BEECHER.